(No Model.)
B. F. RIX.
TWO WHEELED VEHICLE.
No. 364,730. Patented June 14, 1887.
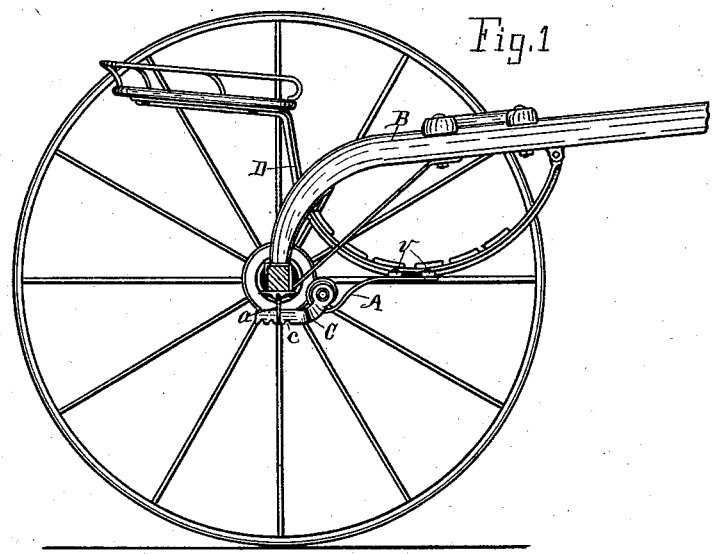
Fig. 1
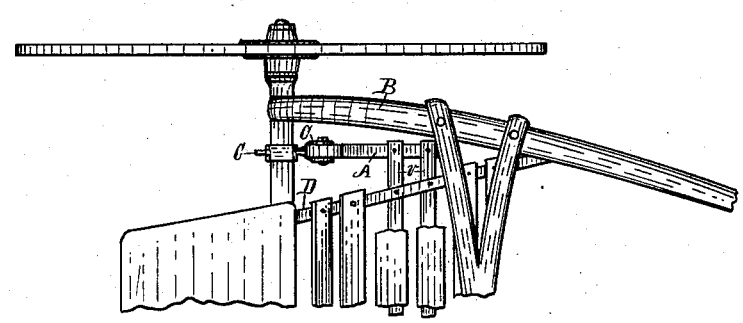
Fig. 2
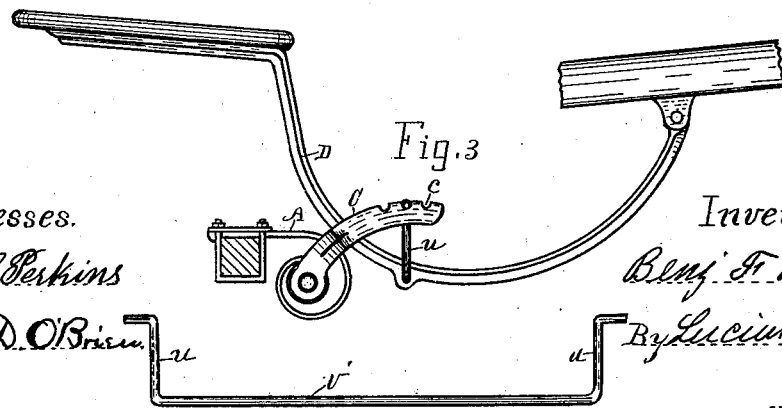
Fig. 3
Fig. 4
Witnesses.
John C. Perkins
Stephen D. O'Brien
Inventor.
Benj. F. Rix
By Lucius C. West
Atty.

UNITED STATES PATENT OFFICE.

BENJAMIN F. RIX, OF KALAMAZOO, MICHIGAN.

TWO-WHEELED VEHICLE.

SPECIFICATION forming part of Letters Patent No. 364,730, dated June 14, 1887.

Application filed April 5, 1887. Serial No. 233,694. (No model.)

*To all whom it may concern:*

Be it known that I, BENJAMIN F. RIX, a citizen of the United States, residing at Kalamazoo, county of Kalamazoo, State of Michigan, have invented a new and useful Two-Wheeled Vehicle, of which the following is a specification.

This invention relates to the ordinary style of two-wheeled vehicles the seat-bars or body of which is supported over the axle and fulcrumed at the forward end to the thills; and it has for its object certain improvements, substantially as below described and claimed.

In the drawings forming a part of this specification, Figure 1 is a side elevation with one wheel removed; Fig. 2, a plan of about one-half of the vehicle; Fig. 3, enlarged details from Fig. 1, showing changes in arrangement; and Fig. 4 is a view of a lettered detail in Fig. 3.

Referring to the lettered parts of the drawings, B is the thill, and D the seat-rails or body hinged at the forward end to the thills, as heretofore.

An important feature of this invention consists in the spring-supports of the body and their arrangement with and relation to the body and axle.

In Figs. 1 and 2 the spring A has a coil at one end and a forwardly-extended end attached to the body. A bracket, C, is attached rigidly to the inner end of the coil, and the other end of the bracket forms a link attachment at *a* with the axle. The forward end of the spring A may be attached directly to the body D or seat-bars; or it may be attached to a laterally-projecting support, V, or other suitable support, which is attached securely to the body and projects laterally therefrom. I prefer this plan, for the reason that I can attach the bracket nearer the wheel and allow it to extend forward at right angles to the axle, as it will be seen in Fig. 2 that the seat-bars of the body converge toward the seat. I deem the support projecting laterally from the body quite important, even for the attachment therewith of any style spring in a similar or like relation.

The bracket C is provided with a series of notches, *c*, when desiring to adjust the action of the spring for heavy or light persons, and for one or two persons to ride. The nearer the link *a* is to the rear end of the bracket the freer will be the action of the spring; but, if preferred, this adjustable feature may be dispensed with.

In Fig. 3 I have shown the same spring A and bracket C, but turned the other side up and changed end for end. In this instance the end of the spring is attached to the axle and the end of the bracket is loosely attached to the body. In lieu of the links *a*, I show a rock-shaft, V', Fig. 4, having a crank, *u*, at each end. This shaft extends transversely from one seat-bar to the other and laterally beyond said bars, and has suitable bearings in the bars D. The crank-handles rest in notches *c*. I deem this construction an equivalent to Fig. 1 in all the main essentials.

In a vehicle thus constructed cheapness, simplicity, and desirable appearance are apparent, and a very desirable spring action is attained.

Of course it will be understood that both sides of the vehicle are alike.

Having thus described my invention, what I claim is—

1. The combination, with a two-wheeled-vehicle axle and body fulcrumed at the forward end, of the spring-supports to the body, consisting of the spring having the coiled end and the bracket attached to said coil, substantially as set forth.

2. The combination, with the axle and a body or seat-bars fulcrumed at the forward end and having laterally-projecting supports for the springs, of the spring-supports to the body, consisting of a spring coiled at one end and a bracket attached to the coil, substantially as set forth.

3. The combination of the axle, a body fulcrumed at the forward end, the springs attached at one end to the body and coiled at the other end, and brackets attached to said coils at one end and loosely and adjustably attached to the axle at the other end, or the specified equivalents, substantially as set forth.

In testimony of the foregoing I have hereunto subscribed my name in presence of two witnesses.

BENJAMIN F. RIX.

Witnesses:
R. ARTHUR STONE,
N. N. DAVIS.